Figure 1:
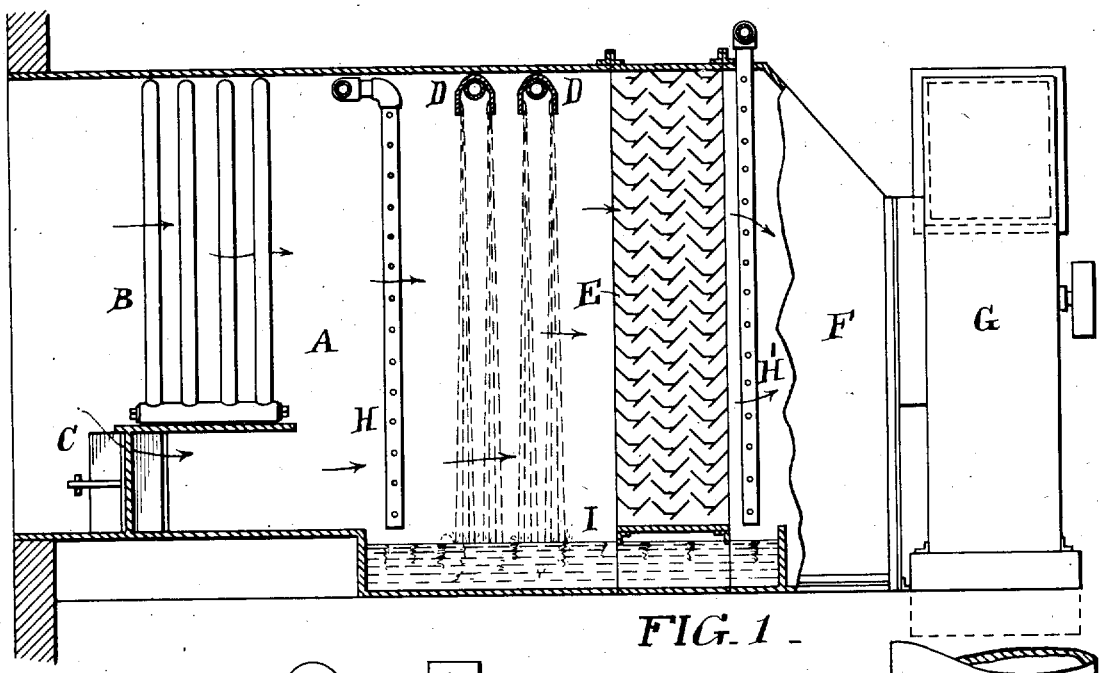

W. G. R. BRAEMER.

METHOD FOR PURIFYING AND HUMIDIFYING AIR.

APPLICATION FILED OCT. 26, 1910.

Reissued June 6, 1916.

14,146.

2 SHEETS—SHEET 1.

Witnesses

Daniel Webster, Jr.

P. M. Kelly.

Inventor

Wm. G. R. Braemer

By

Attorney

W. G. R. BRAEMER.

METHOD FOR PURIFYING AND HUMIDIFYING AIR.

APPLICATION FILED OCT. 26, 1910.

Reissued June 6, 1916.

14,146.

2 SHEETS—SHEET 2.

Witnesses

Daniel Webster Jr.

A. M. Kelly

Inventor

William G. R. Braemer

By

Attorney

UNITED STATES PATENT OFFICE.

WILLIAM G. R. BRAEMER, OF CAMDEN, NEW JERSEY, ASSIGNOR TO WARREN WEBSTER & COMPANY, A CORPORATION OF NEW JERSEY.

METHOD FOR PURIFYING AND HUMIDIFYING AIR.

14,146. Specification of Reissued Letters Patent. Reissued June 6, 1916.

Original application filed October 15, 1907, Serial No. 397,550. Original Patent No. 899,289, dated September 22, 1908. Divided and application filed March 14, 1908, Serial No. 421,167. Patent No. 903,150, dated November 3, 1908. Application for reissue filed October 26, 1910. Serial No. 589,287.

*To all whom it may concern:*

Be it known that I, WILLIAM G. R. BRAEMER, a citizen of the United States, and a resident of the city and county of Camden, State of New Jersey, have invented an Improvement in Methods for Purifying and Humidifying Air, of which the following is a specification.

My invention has reference to method for purifying and humidifying air, and consists of certain improvements which are fully set forth in the following specification, in connection with the accompanying drawings, which form a part thereof.

This application is a division of my application, Serial No. 397,550, filed October 15th, 1907, which more specifically refers to the apparatus hereinafter disclosed and with the employment of which my improved method of humidifying the air may be practised.

The object of my invention is to automatically regulate the humidity of the air supply to the building or rooms therein irrespective of the variations in the external atmospheric conditions, whereby the air at a proper temperature and humidity may be supplied in quantity where desired and unaffected by the variations in the atmosphere outside of the building.

More especially, my object is to provide a method for imparting a definite amount of moisture to air being supplied to a building to give it the humidity required to permit varying the relative humidity and temperature of said air when passing into the building from the humidifying apparatus, the change in relative humidity being secured by varying the temperature of the air after it has been brought to a degree of humidity, which will at any moment insure that a definite amount of moisture is conveyed into the building with a given volume of air to give the desired humidity, irrespective of the variations in temperature of the air within the building.

My invention consists of a method which may be carried into effect by providing a washer and eliminator with means for subjecting the air to aqueous vapor prior to its passing through the eliminator, or after having passed through the eliminator, as preferred, and independent of the washer or the temperature of the water thereof, which latter may be maintained constant at a definite high temperature, and regulating the admission of the aqueous vapor to vary the humidity of the air by means of a suitable humidostat or other automatic device under the action of the air in the building or room or in the flues through which it passes to reach its point of distribution. The hot water of the washer is given a temperature to be determined by test, and adapted to give slightly less absolute humidity to the air than required at the highest temperature of the air leaving the heating apparatus, the additional moisture required being provided by steam or aqueous vapor jets above mentioned.

More specifically, my invention consists of the method of producing air of practically constant relative humidity, which consists in imparting to the fresh air an amount of moisture which, together with that in the inflowing fresh air, is slightly less than the total amount of moisture required to impart the proper relative humidity when the air is raised to the temperature at which it is to be used, imparting to the air an additional and variable amount of moisture which, with the first mentioned moisture, gives to the air the total amount required, raising the air of absolute humidity to a temperature which will lower the relative humidity to that required, and automatically regulating the variable amount of moisture imparted to the air to maintain a fixed absolute humidity and constant relative humidity.

My invention will be better understood by reference to the drawings, in which:—

Figure 2:
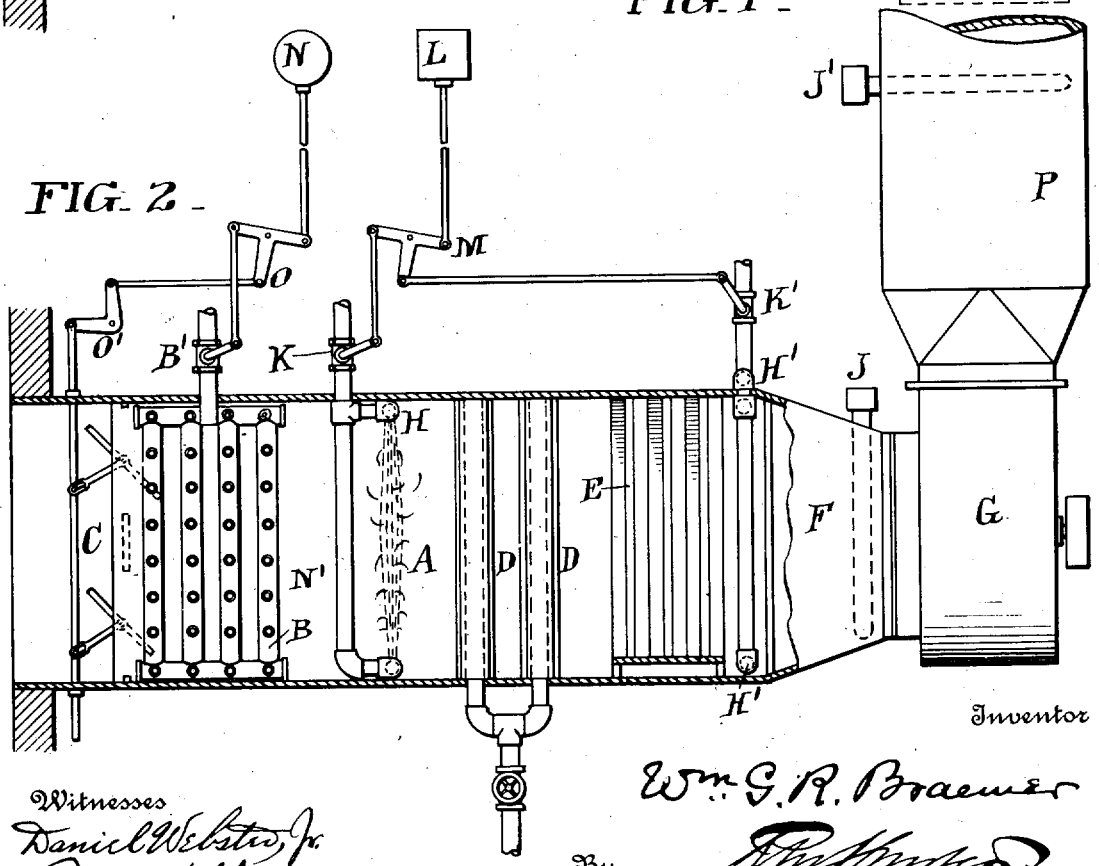

Figure 1 is a sectional side elevation of an apparatus for purifying and humidifying air; Fig. 2 is a sectional plan view of the same; and Fig. 3 is a view similar to Fig. 2 showing other arrangements of the controlling devices.

A is the casing of the apparatus, and adjacent to its inlet side it is provided with tempering steam coils B, by which the incoming air may be heated to the desired preliminary degree. Immediately below the tempering coils are the usual by-pass dampers C which permit more or less of the fresh air to pass into the humidifying apparatus without being heated by the tempering coils B. In this manner, the mixture of the incoming air may be heated to substantially the desired degree before being subjected to the humidifying treatment. The tempered air is purified and humidified by being made to pass through one or more sheets of hot falling water from the spraying pipes D D, the sheets of hot falling water being indicated in dotted lines in Fig. 1. The humidified air then passes through the eliminator E which removes the excess of moisture, and thence passes through the chamber F to the blower G, from whence it is driven through a flue P into the room or compartment in which it is to be utilized. The temperature of the water from the spraying pipes D D imparts to the air a little less moisture or humidity than required at the highest temperature of the air leaving the heating apparatus for delivery into the room, and the additional amount of moisture or humidity which is required to give the predetermined total amount of moisture or absolute humidity to the air is supplied by means of the steam jets H H or H′ H′ or both combined. Ordinarily, one set of such jet pipes will suffice. The pipes H H are shown as located in the casing A between the tempering coils B and the spraying pipes D, so that they impart to the incoming air not only a degree of humidity but also some increase in temperature, and in that way the air after passing through the steam jets and the sheets of hot falling water from the spraying pipes is brought to the requisite absolute humidity, and then passes through the eliminator to have the excess of moisture removed. When the air is thus purified and brought to the requisite degree of absolute humidity, it is subjected, on its way to the room where it is to be utilized, to the action of heaters in case the temperature is required to be considerably raised, especially where the air is to be conveyed over a long distance before reaching the room, and in which case it would have to be raised considerably in temperature because of the drop in temperature in transit. This increase in temperature of the humidified air may be produced by means of a steam heater J, J′, the former operating upon the humidified air before passing into the blower G and the latter operating upon it after it leaves the blower. Either or both of these heaters, may be employed as desired. Moreover, the means for heating the air to raise its temperature and lower its relative humidity (while maintaining its fixed or absolute humidity,) may be of the ordinary construction, similar to the tempering coils B with the by-pass controlling devices C, whereby the amount of heat imparted to the air may be easily regulated without varying the steam in the steam coils.

Figure 3:
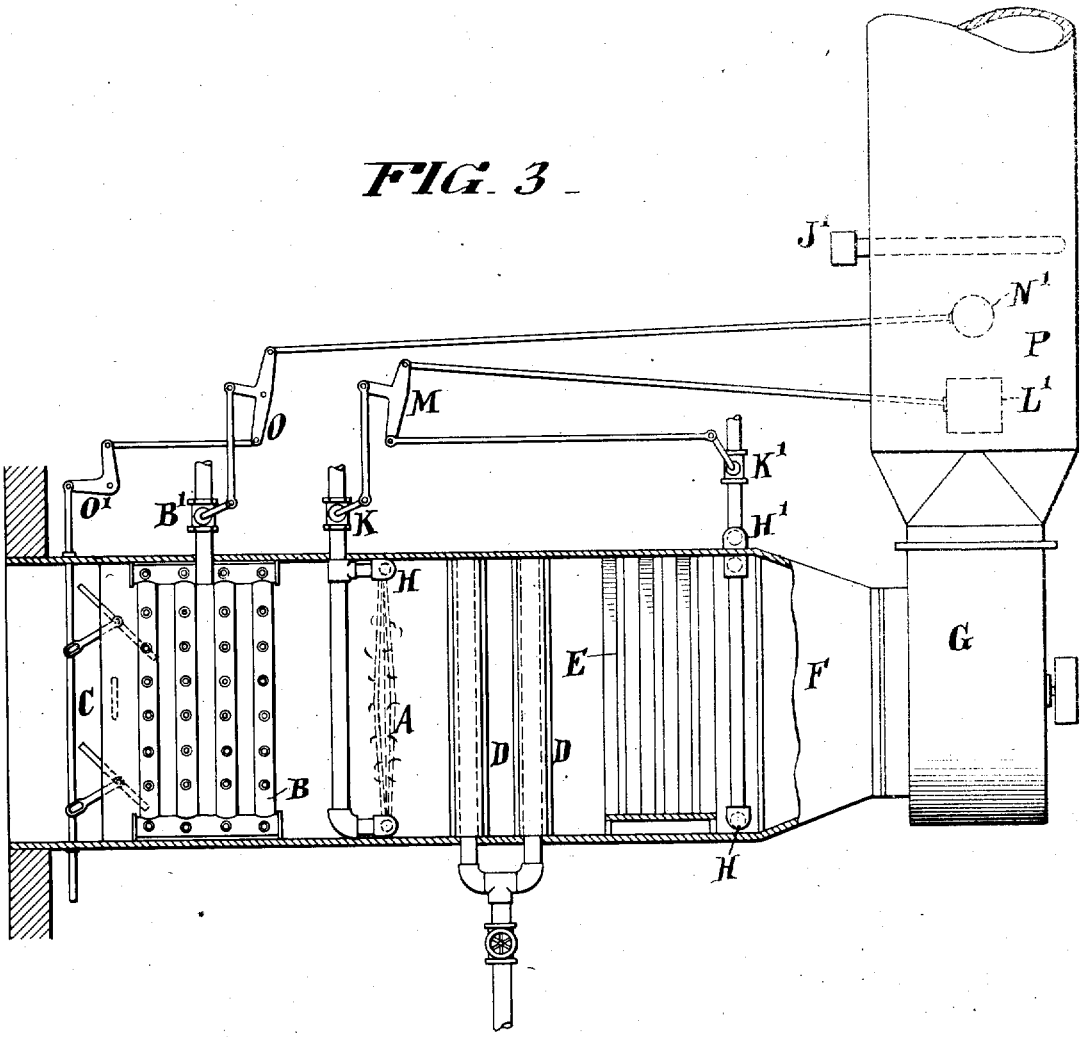

In case there is any variation in the humidity imparted to the air such as to produce a variation in the relative humidity of the heated air in the room when said air is supplied at a fixed temperature, then the amount of moisture imparted to the air in the purifying apparatus is regulated by controlling the action of the steam jets H H′, and this is accomplished by the valves K K′ which are automatically operated by means of a humidostat or other automatic regulating apparatus L arranged in the room, in which the air is delivered, or arranged in the pipe P, as shown in Fig. 3 at L′. By means of this humidostat L, Fig. 1, the lowering of the relative humidity in this room, while the temperature remains fixed, will cause it to operate through the connections M, so as to open the valves K K′, or either of them, to a greater extent and permit more steam to pass from the steam jets for the purpose of increasing the humidity in the air prior to its reaching the blower G. Should the humidity in the room increase above that required, then the reverse operation takes place with a reduction of the steam jets and a lowering of the humidity imparted to the air before reaching the blower. A similar action will take place in respect to the use of the humidostat L′, Fig. 2, as in this case the conditions of the air passing through the conduit or pipe B will act to control the extent of humidity supplied to the air, though it is affected by the conditions of the air on its way to the room rather than the conditions of the same air after delivery into the room. Of course, in the case of Fig. 1, the varying conditions of the room caused by such acts as opening doors or windows will induce regulations which would not be required from the apparatus shown in Fig. 2, but these are secondary to the main functions.

The tempering coils B and the by-pass dampers C are preferably regulated automatically by means of a thermostat N (Fig. 2) which may be arranged in the room to be heated or which may be arranged in the apparatus as at N′, Fig. 3, for example, so as to maintain the incoming air mixture at a fixed temperature. The thermostat will operate through the devices O to regulate the steam valve B′ of the tempering coils B and the devices O′ to regulate the by-pass dampers C. Where by-pass dampers C are employed, it is not essential to use the steam regulating valve B′ because the variation in temperature may be controlled within reasonable limits by the dampers C, which are more rapid in inducing changes of temperature.

The water from the perforated pipes D falls in sheets of spray or like rain down into the tank I at the bottom, and the collected water taken from the air by the eliminator E is also delivered to this tank. The temperature of the water from the pipes D is maintained practically constant in any suitable manner, and this temperature is predetermined after deciding upon the maximum temperature which is required to be given to the humidified air delivered to the room and should be such as to impart slightly less than the required humidity for the air.

While the best results contemplate the use of hot water for the spray, nevertheless the water may be of any temperature desired so long as it remains practically constant. Thus, ordinary hydrant water may be employed and the greater part of the moisture required to secure the proper humidity desired will be obtained by the steam vapor. Of course, it is evident that this fixed relative humidity which would be given by the hot water from the pipes D might be considerably below that which is required, reliance being placed upon the steam jets H H′ to make up the deficiency in humidity or amount of moisture required to secure the proper absolute humidity or total amount of moisture required in the purifying apparatus and the proper relative humidity in the room to be heated. I therefore, do not restrict myself to any fixed amount of humidity to be given by the pipes D and hot water therefrom, except that it shall be less than the maximum humidity required. It is also evident that while the spraying pipes H H′ are designed for producing jets of steam, they may nevertheless be employed to produce the jets of intensely hot water, which water might be held under considerable pressure, so that the water spray would burst into steam when projected into the casing A. The eliminator may be made similar to the structure set out in my application, Serial No. 392,251, filed September 11th, 1907, but I do not restrict myself to any particular construction of eliminator, as this part of the device may be made in any convenient manner.

The essential feature of my invention is in the combination of the means which impart less than the maximum amount of moisture required with supplementing independent devices for supplying, under regulation, the additional amount of moisture required to produce the total amount for the absolute humidity necessary to secure the relative humidity required at the predetermined temperature of the room.

In the operation of this apparatus, it will be observed that, assuming the air to be used at a certain constant temperature and relative humidity, it becomes necessary to bring the air to an absolute humidity and temperature such, that when the air is raised to the final temperature for use, the moisture due to the absolute humidity will, with the rarefying of the air impart a lower relative humidity as compared with the humidity of the air before passing to the blower, and its relative humidity and temperature under these conditions will be substantially constant and that which is required for the building or room.

While I have shown and described apparatus suitable for carrying my improved method into practice, I do not claim said apparatus herein as the same forms subject matter of my application hereinbefore referred to and of which this is a division.

Having now described my invention, what I claim as new, and desire to secure by Letters Patent, is:—

1. The herein described method of producing air of practically constant relative humidity, which consists in imparting to the fresh air an amount of moisture which, together with that in the inflowing fresh air, is slightly less than the full amount required, imparting to the air an additional and variable amount of moisture which with the first mentioned moisture gives to the air approximately the entire amount required, raising the temperature of the humidified air to lower its relative humidity, and automatically regulating the variable moisture imparted to the air to maintain an approximately constant relative humidity.

2. The herein described method of producing air of suitable humidity, which consists in subjecting a current of air to a body of hot water of substantially constant temperature, eliminating the surplus moisture suspended in the humidified air, supplying to the humidified air a hot aqueous vapor to increase the amount of moisture in the air to substantially the total amount of moisture desired, and regulating the temperature of the current of air before being delivered to the hot body of water to keep the temperature of said air maintained irrespective of temperature variations in the outside atmosphere.

3. The herein described method of producing air of suitable humidity, which consists in subjecting a current of air to a body of hot water of substantially constant temperature, eliminating the surplus moisture suspended in the humidified air, supplying to the humidified air a hot aqueous vapor to increase the amount of moisture in the air to substantially the total amount of moisture desired, regulating the temperature of the current of air before being delivered to the hot body of water by mixing heated and unheated bodies of air and further regulating the temperature of the mixed bodies of incoming air under the control of the temperature of the air after being fully humidified.

4. The herein described method of producing air of suitable humidity, which consists in subjecting a current of air to a body of hot water of substantially constant temperature, eliminating the surplus moisture suspended in the humidified air, supplying to the humidified air a hot aqueous vapor to increase the amount of moisture in the air to substantially the total amount of moisture required, regulating the temperature of the current of air before being delivered to the hot body of water by mixing heated and unheated bodies of air, further regulating the temperature of the mixed bodies of incoming air under the control of the temperature of the air after receiving the full amount of moisture desired, and also varying the admission of hot aqueous vapor by means under control of the humidity condition of the humidified air to maintain the air at a constant humidity.

5. The herein described method of producing air of a practically constant humidity which consists in producing a current of air, causing said air to pass through a hot body of water of substantially constant temperature, and automatically subjecting the current of air to the variable action of hot aqueous vapor to increase the amount of moisture it contains to maintain it at a substantially constant humidity.

6. The method of humidifying air, which consists in treating a current of air with water of a substantially constant temperature to give to the air a less amount of moisture than that required, supplying aqueous vapor to the air to increase the amount of moisture to approximately the total amount desired and at the same time maintaining said air at a substantially constant temperature, automatically varying the increase in the amount of moisture under the control of the humidity condition of the humidified air to maintain the total amount of moisture required in the air, and varying the temperature of the humidified air to bring it to the desired relative humidity required for final use.

7. The method of producing air of practically constant humidity which consists in treating a current of air with water of substantially constant temperature, increasing the amount of moisture of the air by treating it to hot aqueous vapors before and also after the treatment to the water, maintaining the air at substantially constant temperature during the final treatment with hot aqueous vapors, and controlling the conditions of humidity by varying the increase in the moisture to maintain a substantially constant amount of moisture in the air said control being governed by the humidity of the humidified air after being treated to the hot aqueous vapors.

8. The herein described method of producing air of substantially constant humidity which consists in heating a current of fresh air, imparting to said heated air an amount of moisture which, together with that in the fresh air, is less than the full amount of moisture required, imparting to the air a further variable additional amount of moisture to raise the amount of moisture to approximately the total amount required, and automatically regulating the temperature of the incoming current of heated air and the variable additional amount of moisture to maintain an approximately fixed amount of moisture under the control of the conditions of the humidified air so treated.

9. The herein described method of humidifying air which consists in heating a current of fresh air, imparting to said heated air an amount of moisture which, together with that in the fresh air, is less than the full amount of moisture required, imparting to the air a further variable and additional humidity to raise the amount of moisture to approximately the total amount required, automatically regulating the temperature of the incoming current of heated air and the variable additional amount of moisture to maintain an approximately constant amount of moisture by means under the control of the conditions of the humidified air so treated, and also raising the temperature of the air so humidified to lower its relative humidity to that required at the place of consumption.

10. The herein described method of producing air of substantially constant relative humidity, which consists in imparting to the fresh air an amount of moisture which, together with that in the fresh air, is less than the full amount required, imparting to the air an additional and variable amount of moisture which with the first mentioned moisture gives to the air approximately the entire amount required, and automatically regulating the variable moisture imparted to the air to maintain an approximately fixed relative humidity.

11. The herein described method of humidifying air, which consists in first imparting to the fresh air an amount of moisture less than the full amount required, and subsequently imparting to the air an additional amount of moisture in a heated condition which with the first mentioned moisture gives to the air approximately the entire amount desired at the point of use.

12. The herein described method of humidifying air, which consists in first imparting to the fresh air an amount of moisture less than the full amount required, and subsequently imparting to the air an additional and variable amount of moisture which with the first mentioned moisture gives to the air approximately the entire amount desired at the point of use, and automatically regulating the additional moisture so imparted to the air to suit the conditions and requirements desired.

In testimony of which invention, I have hereunto set my hand.

WM. G. R. BRAEMER.

Witnesses:

R. M. KELLY,

M. G. EGAN.